US012293669B2

(12) United States Patent
Lebbos et al.

(10) Patent No.: US 12,293,669 B2
(45) Date of Patent: May 6, 2025

(54) AIRCRAFT PAIRING TOOL FOR FORMATION FLIGHT

(71) Applicant: Airbus SAS, Blagnac (FR)

(72) Inventors: Imad Lebbos, Blagnac (FR); Daniel Percy, Blagnac (FR); Julio Hernanz Gonzalez, Blagnac (FR)

(73) Assignee: Airbus SAS, Blagnac (FR)

( * ) Notice: Subject to any disclaimer, the term of this patent is extended or adjusted under 35 U.S.C. 154(b) by 914 days.

(21) Appl. No.: 17/382,017

(22) Filed: Jul. 21, 2021

(65) Prior Publication Data

US 2022/0028284 A1 Jan. 27, 2022

(30) Foreign Application Priority Data

Jul. 23, 2020 (FR) .................................... 2007770

(51) Int. Cl.
*G08G 5/00* (2006.01)
*B64D 43/00* (2006.01)
*B64D 45/00* (2006.01)

(52) U.S. Cl.
CPC .......... *G08G 5/0039* (2013.01); *B64D 43/00* (2013.01); *B64D 45/00* (2013.01); *G08G 5/0008* (2013.01)

(58) Field of Classification Search
CPC .. G08G 5/0039; G08G 5/0008; G08G 5/0026; G08G 5/0034; G08G 5/0043; G08G 5/0091; G08G 5/0013; G08G 5/0021; B64D 43/00; B64D 45/00; G05D 1/104
See application file for complete search history.

(56) References Cited

U.S. PATENT DOCUMENTS

| | | | | |
|---|---|---|---|---|
| 2016/0236790 A1* | 8/2016 | Knapp | ..................... | B64C 11/44 |
| 2018/0268722 A1* | 9/2018 | Meier | ................... | G01C 21/005 |
| 2019/0004544 A1* | 1/2019 | Feldmann | ............. | G08G 5/0052 |
| 2019/0287412 A1* | 9/2019 | Garai | ...................... | G08G 5/025 |
| 2020/0033892 A1* | 1/2020 | Aldarwish | .............. | B64C 39/02 |
| 2020/0098272 A1* | 3/2020 | Manberg | .............. | G08G 5/0052 |

(Continued)

FOREIGN PATENT DOCUMENTS

WO  WO-2017161304 A1 * 9/2017 ............. B64C 13/16

OTHER PUBLICATIONS

Form FAA 7233-1—Flight Plan, Feb. 7, 2024, Federal Aviation Administration, https://www.faa.gov/forms/index.cfm/go/document.information/documentID/186159 (Year: 2024).*

(Continued)

*Primary Examiner* — Daniel M. Robert
(74) *Attorney, Agent, or Firm* — Greer, Burns & Crain, Ltd.

(57) ABSTRACT

An aircraft pairing system and method are provided to arrange for scheduling flights of two or more aircraft. The system and method allow to identify pairs of aircraft flights, wherein the aircraft can be brought together into a formation with a follower aircraft flying in the wake upwash of a leader aircraft to generate fuel savings. The system and method utilize historical flight data to generate a list of possible flight pairings and anticipated fuel savings, and live data to update the possible flight pairings and anticipated fuel savings. A display of the possible flight pairings and anticipated fuel savings is provided on a user interface. The user may accept flight pairings and extract data to modify flight plans.

17 Claims, 9 Drawing Sheets

(56) References Cited

U.S. PATENT DOCUMENTS

2020/0175881 A1* 6/2020 Trim .................... G08G 5/0043
2022/0198943 A1* 6/2022 Vining .................. G06N 20/00

OTHER PUBLICATIONS

Thomas Kent and Arthur G Richards, "Analytic Approach to Optimal Routing for Commercial Formation Flight," Journal of Guidance , Control, and Dynamics 38 No. 10 (2015): 1872-1884. (Year: 2015).*
Jia Xu et al., "Aircraft Route Optimization for Formation Flight," Journal of Aircraft 51 (2014): 490-501. (Year: 2014).*
Fabec, "Predicting Flight Routes with a Deep Neural Network in Operation Air Traffic Flow and Capacity Management System" (Feb. 2018): 1-7. (Year: 2018).*
Nick Macdonald, "Airlines are looking to reduce fuel consumption. Wake energy retrieval could help _ Airbus," Nov. 18, 2019, https://www.airbus.com/en/newsroom/stories/2019-11-airlines-are-looking-to-reduce-fuel-consumption-wake-energy-retrieval. (Year: 2019).*
U.S. Appl. No. 16/951,896, filed Nov. 18, 2020.
U.S. Appl. No. 16/951,887, filed Nov. 18, 2020.

* cited by examiner

| Scheduled departure time | Follower flight | Leader flight | Estimated fuel impact | Estimated time impact | Forecast Flock Ratio | Flight status | Actions | Message |
|---|---|---|---|---|---|---|---|---|
| 11:55 | A0123 | DP74 | -3600kg | +03 mins | 82% | F_Validated | ▼ | |
| 11:55 | A0123 | IL95 | -3050kg | +12 mins | 73% | LF_Validated | ▼ | |
| 12:05 | A0134 | JG94 | -1100kg | +00 mins | 38% | Forecast | ▼ | |
| 12:15 | A0199 | NM80 | -4050kg | +00 mins | 87% | Forecast | ▼ | |
| ... | ... | ... | ... | ... | ... | ... | ... | |

Figure 3

| Scheduled departure time | Follower flight | Leader flight | Estimated fuel impact | Estimated flight time impact | Forecast Flock Ratio | Flight status | Actions | Message |
|---|---|---|---|---|---|---|---|---|
| 11:55 | A0123 | D974 | -3600kg | +03 mins | 82% | F_Validated | ▼ | |
| 11:55 | A0123 | IL95 | -3050 kg | +12 mins | 73% | LF_Validated | ▼ | |
| 12:05 | A0134 | JG94 | -1100kg | +00 mins | 38% | L_FPLN filed | ▼ Optimization | |
| 12:15 | A0199 | A0280 | -4050kg | +00 mins | 87% | Forecast | ▼ | |
| ... | ... | ... | ... | ... | ... | ... | ... | |

Figure 7

| Scheduled departure time | Follower flight | Leader flight | Estimated fuel impact | Estimated time impat | Forecast Flock Ratio | Flight status | Actions | Message |
|---|---|---|---|---|---|---|---|---|
| 11:55 | A0123 | DP74 | -3600kg | +03 mins | 82% | F_Validated | ▼ | |
| 11:40 | DP74 | A0123 | -3200kg | +03 mins | 78% | L_Validated | ▼ | |
| ... | ... | ... | ... | ... | ... | ... | ... | |

Figure 9

AIRCRAFT PAIRING TOOL FOR FORMATION FLIGHT

CROSS-REFERENCES TO RELATED APPLICATIONS

This application claims the benefit of the French Provisional Application No. 2007770, filed on Jul. 23, 2020, the entire disclosures of which are incorporated herein by way of reference.

FIELD OF THE INVENTION

The present invention relates to a system and a method for arranging for scheduling and arranging for flights of two or more aircraft.

BACKGROUND OF THE INVENTION

When flying, an aircraft generates in its wake, two wake vortices. Each vortex consists of a high energy rotating core surrounded by a smoother rotating airflow. When viewed from behind the aircraft, the left vortex rotates clockwise and the right vortex rotates counter-clockwise. The rotating airflow on the outboard side of each vortex is therefore moving upwards, creating an air current called an upwash.

It can be useful for another aircraft, which will be called a follower aircraft, to be able to fly in formation behind a leading aircraft, in the upwash region of the leader's trailing vortices. By flying in the upwash, the follower aircraft can take advantage of kinetic energy present in the movement of the air, to reduce its fuel consumption.

A number of aerospace organizations have performed tests and proven that the level of fuel reduction can be in the region of 5-10% fuel reduction per trip for a follower aircraft. However, in considering deployment of formation flying for commercial aviation, a number of operational planning challenges arise.

Today's airline flight schedules, flight planning activities, and operating procedures together with Air Navigation Service Providers (ANSPs) are not designed for formation flying. Consequently, to the inventor's knowledge, no devices or methods exist for helping to identify pairs of actual and scheduled commercial flights that can operate together in formation as a leader and a follower, in order that they agree to the operation, adapt flight plans, and generate fuel savings.

Additionally, for pairs of aircraft to fly in formation it is important that aircraft pilots and Air Traffic Controllers be supplied with valid information in advance of departure, including aircraft registration and flight number information for possible paired aircraft.

The difficulty of solving these operational questions lies in the significant level of variability between actual and planned operations due to factors such as ground delays before departure, airspace congestion, and variability in airline routings driven by meteorological conditions. Proposing pairings on the basis of departure schedules is therefore insufficient.

At the same time, waiting until aircraft are in the skies to start a decision making process about pairings is not consistent with existing airline and ANSP mission planning and validation operations, since these processes normally take place before flight departure.

SUMMARY OF THE INVENTION

The invention proposes to resolve these operational challenges by proposing a device or system for airline staff, which provides a method to predict the pairs of aircraft most likely to occur on the conditions of the day, so that the maximum level of validation possible can be completed before departure of interesting possible pairs, and the details to be included in flight plans for communication to pilots and ANSPs.

Rather than using schedule data, the system processes historical flight tracking data to identify historical patterns of proximity. Subsequently, inclusion of historical operational and environmental data enables the system to quantify patterns which drive proximity for pairs of flights, in order to build a predictive model. The model is then used to support airline and ANSP operational needs by performing a comparison with live situational data.

The output is, for a given flight of a commercial aircraft, a list of possible flights to carry out a fuel saving formation flight with, together with estimations of the fuel saving and flight time impacts. Once identified and listed, the paired flights are subject to compliance with operator procedures and to validation by ANSPs. The invention includes a means to ensure the relevant paired flight identification information is supplied to the operator and ANSPs during their checks and validations, and is available in standardized flight operations means such as flight plans.

BRIEF DESCRIPTION OF THE DRAWINGS

FIG. 3 is a schematic diagram illustrating the display in a system interface of the list of forecast flight pairs and associated parameters, including flight status.

FIG. 7 is a schematic diagram illustrating the display in the system interface of the list of forecast flight pairs and associated parameters, including flight status.

FIG. 9 is a schematic diagram illustrating the display in the system interface of the list of forecast flight pairs and associated parameters.

DETAILED DESCRIPTION OF THE PREFERRED EMBODIMENTS

A basic function of a system 18 embodying the invention is to identify pairs of aircraft which can be brought together into a formation with a follower aircraft flying in the wake upwash of a leader aircraft, in order that the follower generates fuel savings, and to generate information required to enable the flight operation.

Figure 1:
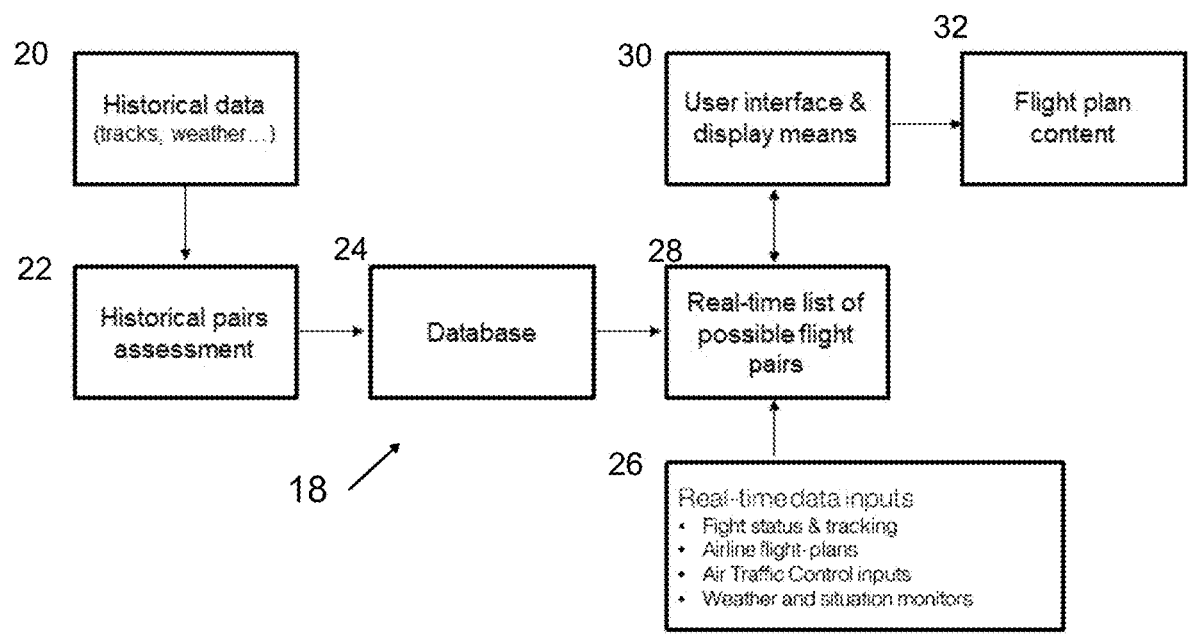
FIG. 1 is a schematic diagram illustrating a basic embodiment of the invention.

As shown in FIG. 1, there is the system 18 of elements, devices and modules to undertake a method of identifying pairs of aircraft which can be brought together into a formation to generate fuel savings, and to generate information required to enable the flight operation. A first data element or data module 20 is configured to source historical information, including aircraft flight track data, and weather and traffic conditions at airports and in flight zones. This data is transformed by a first assessment element or assessment module 22, to identify pairs of aircraft flights which were sufficiently close together under historical conditions that they could have been suitable for pairing.

For each identified pair, additional historical information is retrieved by the first assessment module 22, including weather and traffic information. Furthermore, an estimation of the magnitude of the fuel saving benefit and associated flight time impacts which would occur if the two aircraft had flown together in formation is also completed by the first assessment module 22. The information is then stored in a database 24.

Database 24 contains an indexing system allowing a linkage of the information for identified pairs to scheduled airline flights across time. The indexing system includes the aircraft flight number, scheduled departure time, and origin and destination airports.

The database 24 makes it possible, for a combination of any pair of scheduled flights, to compute a measure of the likely proximity of pairs of planned flights. The measure of proximity is called the 'Forecast Flock Ratio' (FFR).

Assessment of the FFR is completed by a second assessment element or second assessment module 28. Element 28 compares real-time information about flights prior to their departure coming from input element or input module 26, with the historical information stored in database 24. The comparison allows second assessment element 28 to calculate and update in real-time, the FFRs for identified pairs of flights. A list is produced by element 28 which allows an identification of the candidate flight pairs which are most likely for any given airline scheduled flight. The list is updated in real-time.

Airlines which desire to pair their flights either with their own flights or with those of another airline are able to consult the relevant information for their operations through user interface and display device or element 30. Users of element 30 will principally be flight operations specialists, responsible for assessing the best route for each flight and producing a flight plan for the flight crew.

Airlines will be able to enter information into element 30, including the registration of the aircraft scheduled for use on a specific flight, and the aircraft's level of capability for participating in a formation flight pair as both a leader and as a follower. Airlines will also be able to express operational preferences, including specifying the other airlines, aircraft types, and routes in which they are interested in operating together with another aircraft.

Taking into account the inputs from airlines, element 30 will display possible flight pairs for each airline flight, together with FFR information, and estimates of the fuel savings and associated flight time impacts which could occur. Using this information, airline flight operations specialists will prioritize specific flight pairings and prepare flight plans in module 32 which include operation specific information.

Information to be included in the flight plans in module 32 to facilitate pairing operations will include flight numbers and callsigns of paired aircraft, anticipated latitude and longitude coordinates for air navigation waypoints at which each flight pair is expected to initiate flight operations as an identified pair of aircraft flying together, and optimum altitude and Mach speed for the pair of aircraft in cruise.

For any historical airline flight, the full trajectory is recorded as a series of latitude and longitude coordinates in time. This information is retrieved in the first data element 20 for assessment in the first assessment element 22.

Other data sources retrieved include data available from public and private organizations including Air Navigation Service Providers (ANSPs), weather monitoring organizations, and airline schedule data providers.

With the retrieved track information, an analysis is performed in the first assessment module 22 in order to identify pairs of aircraft that flew with sufficient historical geo-proximity that they could have been paired together for flight in formation.

The first step in the analysis is to represent each flight trajectory as a series of segments with interconnecting nodes. Segments which exist within the same time window are selected for comparison. The comparison creates measures of segment proximity in latitude and in longitude, and of how similar the segments are in heading.

To perform these measures several distances are calculated using, for instance, the TRACLUS algorithm. These distances are:

An angular distance, accounting for the difference in heading between the aircraft.

A longitudinal distance, accounting for the difference in space in the direction parallel to the segments.

A lateral distance, accounting for the spatial difference in the direction perpendicular to the segments.

These distances are weighed and aggregated to give a single measure of geo-proximity between the segments. Clusters of segments are subsequently identified, where segments have satisfied the conditions of proximity.

The geo-proximity measure and subsequent identification of clusters is useful for identifying segments of pairs of flights which were close together. However, it is insufficient for determining the overall quality of a pairing across the full length of the flights.

Figure 2:
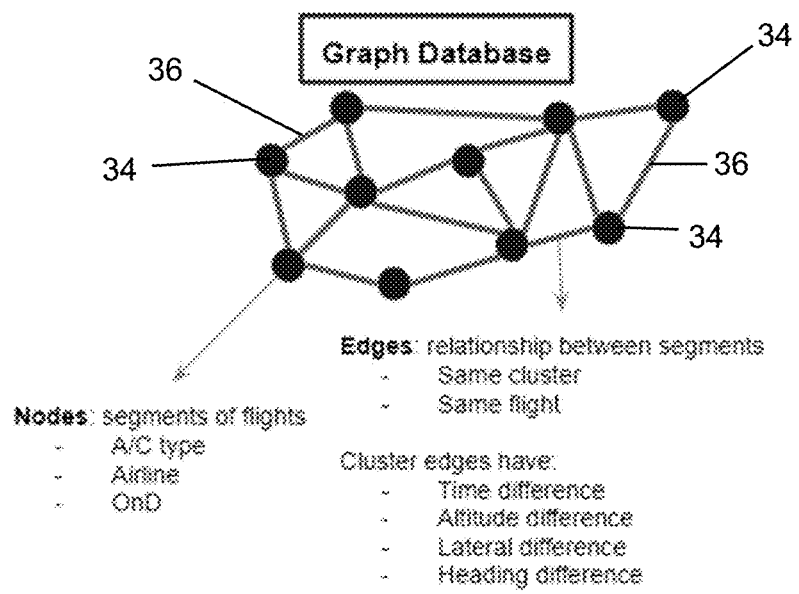
FIG. 2 is a schematic diagram illustrating the use of a graph database in assessment of historical flight proximity.

To resolve the need for further analysis, a graph database, as shown in FIG. 2 comprising nodes 34 and edges 36, is created from the results of the geo-proximity analysis, upon which further filtering can be completed.

Each node 34 in the database represents a segment, labeled with an identification code containing metadata about the flight, such as airline, aircraft type, and origin and destination, and the cluster identification code if one was attributed to the segment because it was in proximity to another segment.

Between the nodes 34, the edges 36 in the database contain information about any identified relationship between two segments. Two relationships are possible; either the two segments belong to the same flight, or they have satisfied the conditions of proximity and are therefore in the same cluster. If the nodes 34 belong to the same cluster, the edges 36 contain information about the differences in time, altitude, latitude, longitude and heading.

The information included on the nodes 34 and the edges 36 is used to filter the database in order to identify candidate pairs for flying together. Pairs of segments which have satisfied the search conditions are analyzed to create measures of the quality of the identified opportunity.

The principle measure includes the determination of the percentage of total segments for a flight which are assessed as in proximity to the other flight. This measure is labeled the Theoretical Flock Ratio.

Additional measures include, for instance:
The mean differences in altitude and Mach between flights
The distance between origin airports of the two flights
The distance between destination airports of the two flights
The distance between the aircraft at the first valid pair of segments For each identified opportunity, an aircraft performance assessment is completed for both leader and follower. Specifically, the assessment comprises a simulation of the flights of the two aircraft, determining position and altitude, weight, speed and elapsed time throughout the flight.

The first step in the assessment is a simulation of the solo flights to identify the baseline fuel consumption and flight time of the historical flights. The second step in the assessment is a simulation of the theoretical formation flight they could have flown in common, to identify the equivalent fuel consumption and flight time.

The calculation of the fuel consumption for the theoretical formation flight includes novel steps in this assessment, such as calculating the fuel consumption for leader and/or follower to accelerate and/or decelerate to bring the pair of aircraft sufficiently close together to form a formation, for example, up to 3 nautical miles apart.

Novel steps also include identification and simulation of a common flight path for the two aircraft in terms of altitude and speed, which produces an optimized profile of fuel consumption and flight time for the pair of aircraft, including the benefit for the follower aircraft from flying in the wake upwash.

This calculation can be completed as per the methodology described in U.S. patent application Ser. Nos. 16/951,896 and 16/951,887, both filed on Nov. 18, 2020, and their respective provisional applications 62/937,493 & 62/937,500, both filed on Nov. 19, 2019, the disclosures of which are incorporated by reference.

Finally, a record of the historical conditions for both flights is compiled. This record includes:
Difference between scheduled and actual departure times for each flight individually
Actual difference in departure time between the two flights
Difference between scheduled departure time between the two flights
Weather information for the airport and track
Airport delays information
Airspace congestion and regulations information For each identified opportunity, the results of the quality measures, the assessment of the fuel consumption, and the historical conditions are recorded in the database 24.

The database indexing system allows an association of specific flights with the same scheduled operation, conducted on previous and subsequent days.

Real-time data sources are retrieved from public and private organizations including Air Navigation Service Providers (ANSPs), weather monitoring organizations, and providers of live aircraft tracking data.

Parameters monitored in real time include estimates of an aircraft's predicted takeoff time, called the Calculated Takeoff Time (CTT). CTT data is either captured directly from ANSP providers included in the live data sources, or where not provided by ANSPs is calculated within element 26 using available live operational data about airspace and airport congestion and conditions.

Other parameters monitored include airport conditions information such as average departure delay, and flight status information coming from aircraft transponders and ADS-B signals.

Where flight plan information is made public via ANSP data sources, this data is also retrieved once flight plans for a specific flight are submitted by the airline to the authorities.

A main objective of this function of element 28 is to create, for any scheduled airline flight, a shortlist of possible other flights for pairing. A list of possible pairs is generated taking into account the identified pairs included in the database 24, in combination with inputs from airlines through interface 30 and real-time information coming from inputs 26.

For each flight pair in the generated list, the data in the database 24 is used to assess the sensitivity of variation of the flock ratio to the different measures of historical operational and environmental conditions. These sensitivities are characterized for each pair of flights in a relational model called the Flock Ratio Sensitivity (FRS) function.

For each flight pair in the generated list, real time data from inputs 26 are compared to the FRS measures as soon as live data becomes relevant for the flights. The output of the comparisons is a Forecast Flock Ratio (FFR) for each flight pair.

A very simplified example of this process would be, if the FRS model for a given flight pair has characterized the variance of TFR as dropping steeply to zero once the difference in departure times between the two flights is above a certain threshold value, then the FFR will drop to zero if that threshold is surpassed. Or alternatively, if it is known that under certain weather conditions, the pair of aircraft never share the same routing, then the FFR will be zero.

Where an FFR is available for a pair of aircraft, it is then used to calculate the estimated fuel consumption and flight time impacts. This information is communicated to the airline through interface 30.

As new live information becomes available through inputs 26, the FFR is updated. At each update of the FFR, the estimated fuel savings and flight time impact are also recalculated. Each new status of information is shared with the airline through interface 30.

The interface element 30 receives information from airlines which allows the system 18 to refine the shortlist of possible flights for pairing in element 28.

Inputs include:
Flights available for paired formation operations
Assigned aircraft types and registrations
Indications of capability of specific aircraft to fly as leaders and/or followers
Selection and priority among other airlines with which they wish to fly
Limits to which they don't wish to consider an opportunity including (for example minimum expected fuel reduction, maximum arrival time impact at destination)
Expected Takeoff Weight The user interface element 30 also allows airlines to monitor the list and observe real-time updates to the forecast flock ratio and estimated fuel savings. The display 30 can be configured to enable airline staff to identify priority flights according to different criteria such as departure time, expected fuel savings. The display 30 can be filtered to identify specific flights of interest.

A deeper level of information is available for each flight, where the different pairing options are listed in detail, together with the forecast flock ratio, expected fuel savings and flight time impact. Airline staff are able to tag flight pairings assessed to be valid, within which they wish to participate. This information is shared with the partner airline in the pairing via their instance of the interface.

Airlines are able to share flight plan information for their flights via the interface if such information is not already filed by the airline with the ANSPs, or not retrieved among the real-time data sources 26. Information from flight plans from one partner airline's flight is made available to the other partner airline for consultation and for use in fuel assessments and flight optimization studies, performed either within the interface 30 or within other flight planning software.

Airlines are able to generate outputs from the interface 30 which enable them to update their flight plans in order to facilitate the operation by providing information needed by pilots and ANSPs, including in mission validation and execution phases.

Using information identified within the interface 30 for flight pairs authorized by both airlines, flight plan documents are created or updated in module 32 with parameters necessary to facilitate the operation, by providing information needed by pilots and ANSPs in both mission validation and execution phases, including:

Flight number of the paired flight or flights
Expected fuel reduction benefits of each pairing
Anticipated navigation waypoint or points at the start of shared flight period
Anticipated navigation waypoint or points at the end of the shared flight period
Altitude and Mach optima for the pair

EXAMPLE 1

Follower Airline

As an example, airline A01 is equipped with a fleet of aircraft capable of flying in formation as followers in order to save fuel. Airline A01 wishes to reduce fuel consumption on flights flown by aircraft equipped to be follower aircraft.

In the majority of cases, airline A01 only has one flight departing in a similar direction at the same time. Airline A01's problem is therefore to identify candidate leader aircraft with which to fly in formation so its aircraft can save fuel.

Airline A01 uses the facilities of the proposed invention to solve the problem of finding leader aircraft.

Step 1: Airline A01 Provides the System of the Invention with Input Conditions

Using element 30 'User interface and display means', airline A01 provides the system 18 of the invention with inputs concerning the flights on which it intends to fly as a follower. The data provided include as a minimum:

Flight number
Date of operation
Origin & destination airports
Assigned aircraft type and registration
Airline A01 may optionally choose to enter additional information about operating parameters related to specific flights, including:
Estimated operating weight at departure
Limits on minimum fuel saving and maximum flight time impact Subsequently, airline A01 may also optionally use element 30 to provide the system 18 with inputs regarding its preferences for flight partners. The inputs include:

Leader airline name or associated code
Type of leader aircraft
The inputs into element 30 trigger activity within element 28 'Real-time list of possible flight pairs'.

Step 2: the System Creates a List of Possible Flight Pairs

The first operation completed by element 28 is to consult database 24 to retrieve historical records of flight pairs which match the parameters entered by airline A01 in interface 30.

In the initial consultation, the records must satisfy the user input conditions 1 Flight number, and 3 Origin and destination airports. The records must also match condition 6 Leader airline name if a parameter was entered by airline A01.

Using these records, a list of possible flight pairs is established within element 28.

Step 3: the System Compares Historical and Live Data to Measure Pairing Quality

For each possible flight pair in the list, element 28 establishes in sequence a number of measures of interest using the records contained with database 24. For a pair of flights, these measures include:

I. Flock Ratio Sensitivity (FRS), to operational conditions
II. Forecast Flock Ratio (FFR)
III. Estimated fuel consumption and flight time impacts The FRS function of element 28 is necessary in order to identify the Forecast Flock Ratio (FFR), which itself is required in order that fuel consumption and flight time impacts can be estimated.

Measure I Flock Ratio Sensitivity (FRS) is a model which characterizes, for a pair of flights, the relationship between Flock Ratio and a number of operational conditions including, for example, the difference in actual departure times between the paired aircraft, and different en-route weather conditions. The relationship is characterized using the records of historical pairs identified by element 22 and stored in database 24.

Subsequently comparisons with live data occur, whereby the FRS function takes live inputs from Element 26 including, for example, the latest weather forecasts and the forecasted actual takeoff time, called the Calculated Takeoff Time (CTT), of each flight in the pair.

These live data are compared to the FRS function's representation of historical cases for the pair of flights. With this comparison, the FRS generates as output measure II, an FFR quantifying the proportion of a flight expected to be flown in a pairing with another aircraft.

Once the FFR is established, it becomes possible for element 28 to establish measure III 'Estimated fuel consumption and flight time impacts'. This is achieved by simulation of the original flight plans of each aircraft, then simulation of the flights including the shared trajectory quantified by the FFR, and finally a comparison of the two sets of results.

This process is repeated for each listed pair of flights.

Step 4: Results are Displayed in a User Interface

The results of Step 3 are displayed as a table in element 30 User Interface & Display Means, as illustrated in FIG. 3.

The user consults the table to identify the status of pairing opportunities for the follower flights they wish to find a leader aircraft to pair with. Information pertinent to decision making are provided, including the details of the paired leader flight, and estimates of the follower's fuel and flight time impacts.

Forecasts and estimates are updated as new live data inputs arrive. Flight status is updated as airline users take actions, including leader (L) and follower (F) validations of the proposed forecast pairings.

Step 5: the Results are Continuously Updated

The process described in Step 3 is repeated for all flights at a frequency which is a multiple of the inputs arriving into the system through element 26, enabling an update of the status for each pair with the latest live data.

At each update, Step 4 is repeated and the table displayed in the user interface 30 is refreshed with the latest information.

Step 6: the User Takes Action Using the Displayed Information

The user can use the interface 30 to take actions. Actions can include:

1. Rejection of a Proposed Pairing

A pairing may offer conditions considered undesirable to the airline A01, such as a flight time impact which is too significant. Alternatively, the airline A01 may have a number of high quality pairing opportunities for a certain flight, and decide to reject ones considered more marginal. It will be possible for the user to configure the display to exclude rejected opportunities.

2. Validation of a Proposed Pairing

For pairing opportunities judged to be interesting, airline A01 can take action to confirm interest in pursuing the pairing.

In this case, both the follower and the partner airline for the leader aircraft will be able to identify that the follower airline A01 has validated the flight by inspection of a 'status' field (for example with the code 'F_Validated' displayed).

3. Add Flight Information

Airline A01 will be able to provide detailed flight information for any of their flights, in order to increase the quality of the pairing opportunities. Such information can include the flight track and/or flight plan, the forecast Takeoff Weight (TOW), flight cruise altitudes, and departure delay information.

4. Initiate Modification of a Flight Plan with Necessary Pairing Information

In cases where the system 18 is integrated with airline flight planning software, Airline A01 will be able to launch an update of the flight plan of a flight in the list, which will be completed by the flight planning software.

The update will provide the information necessary for flight crew and Air Traffic Control to facilitate the pairing operation. The information will include the details of the validated pair of flights including identification of airline A01's flight as being in the follower position, and the leader's flight number and/or callsign.

Navigational information is also provided including the latitude and longitude, or names of waypoints, at which the pairs of aircraft are expected to join-up and to split, and optimum altitude and Mach values for the two aircraft to share during cruise.

In the case that more than one possible flight pairing has been validated by airline A01 for any specific flight, the user will be able to include the information about the other validated pairs in the update.

5. Extract Information Necessary for Modification of a Flight Plan from the System In cases where the system 18 is accessed by airline A01 as a standalone software or web application, Airline A01 will be able to use the interface element 30 to extract from the system information necessary for flight crew and Air Traffic Control to facilitate the pairing operation.

The information will include the details of the validated pair of flights including the identification of airline A01's flight as being in the follower position, and the leader's flight number and/or callsign.

Navigational information is also provided including the latitude and longitude, or names of waypoints, at which the pairs of aircraft are expected to join-up and to split.

The extract can take the form of a dedicated export file for import by other software, or of a copy/paste function to facilitate a paste operation into other software.

In the case that more than one possible flight pairing has been validated by airline A01 for any specific flight, the user will be to include the information about the other validated pairs in the extract.

6. Send a Message to a Partner Airline

A messaging function will make it possible for airline A01 to communicate via the system 18 to the staff of the airline of a proposed leader flight.

The messaging function will also make it possible for airline A01 to receive communications from the airline of the leader. Airline A01 users will be altered to the availability of received messages within the user interface F, including in the results display table described in Step 4.

EXAMPLE 2

Leader Airline

Airline A02 is equipped with a fleet of aircraft capable of flying in formation as leaders, which can be used to facilitate fuel saving with other airlines which have fleets of follower aircraft. Airline A02 wishes to assist other airlines to reduce fuel consumption.

Airline A02's problem is to identify candidate follower aircraft with which to fly in formation, so that it can help the follower aircraft by acting as a leader and providing the wake upwash needed to save fuel. Airline A02 uses the facilities of the system of the invention to solve the problem of finding follower aircraft.

The operation of the system in this example is similar to the operation of the system in Example 1, except from the point of the view of Airline A02, as follows:

Step 1: Airline A02 Provides the Invention with Inputs

Using element 30 'User interface and display means', airline A02 provides the invention with inputs concerning the flights on which it intends to fly as a leader.

The data provided by Airline A02 are the same as described in Example 1 Step 1, with the exception that a leader aircraft will not need to specify a specific type of follower aircraft.

Step 2: the System of the Invention Creates a List of Possible Flight Pairs

The first operation completed by element 28 is to consult database 24 to retrieve records of flight pairs which match the parameters entered by airline A02 in interface 30.

In the initial consultation, the records must satisfy the conditions 1 Flight number, and 3 Origin and destination airports. The records must also match condition 6 Follower airline name if a parameter was entered by airline A02.

Using these records, a list of possible flight pairs is established within element 28.

Step 3: the Invention Compares Historical and Live Data to Measure Pairing Quality The invention completes the comparison of historical and live data without any deviation from the process described in section Example 1 Step 3, with the exception that the list of flights being compared is pertinent to airline A02.

Step 4: Results are Displayed in a User Interface

The system of the invention completes this step without any deviation from the process described in section Example 1, Step 4, with the exception that the estimated fuel and flight time impacts show those which apply to the leader aircraft.

Step 5: the Results are Continuously Updated

The invention completes this step without any deviation from the process described in section Example 1, Step 5.

Step 6: the User Takes Action Using the Displayed Information

The facilities provided to the user are the same as described in Example 1, Step 6.

The only deviation in outputs from the system compared to Example 1 Step 6 occur in relation to the flight plan modifications. In this case, Airline A02's aircraft is identified as the leader, and the follower airline's flight number/callsign is provided.

A number of advances can be conceived upon the basic embodiment, which will individually or in combination, provide additional functionality and benefits to the users.

Figure 4:
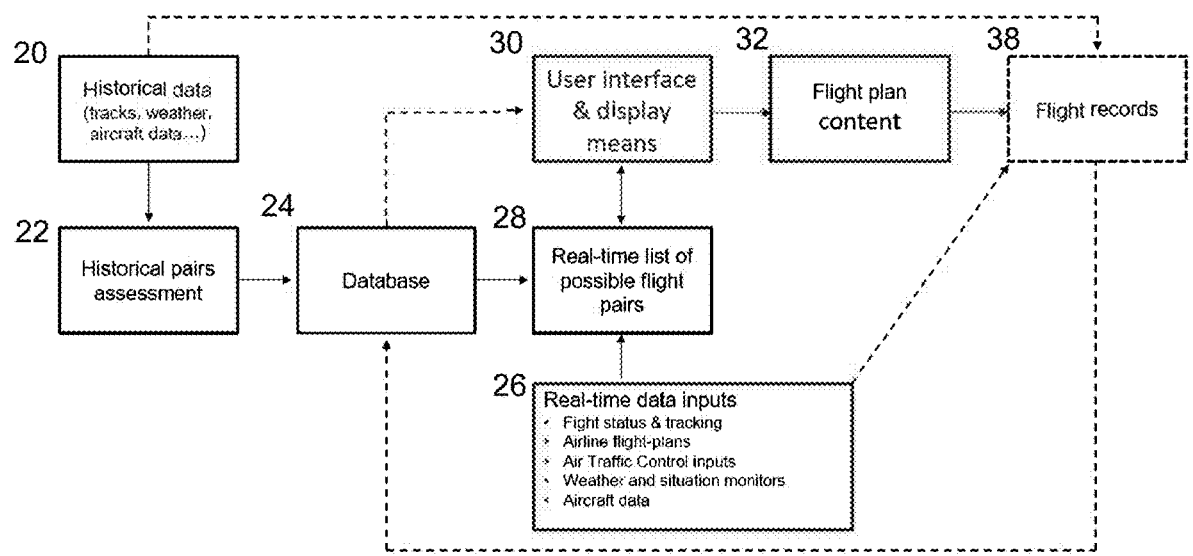
FIG. 4 is a schematic diagram illustrating a first advanced embodiment of the invention which includes storage of formation flight records.

As schematically shown in FIG. 4, a first advanced embodiment of the basic invention involves evaluations of paired flights in order to assess actual operational performance, and the subsequent creation of records in the database for the actual paired flights.

The benefit of this adaptation is to enable post-flight evaluation of the actual impacts on fuel consumption of both leader and follower. A key measure used in the adaptation will be a calculation of the Actual Flock Ratio of paired flights, defined as the percentage of the flight during which the two aircraft were together and performing fuel saving operations.

The assessment is performed by element or module 38, and can take place both during the flight by capturing live aircraft status information, and then be completed post-flight by adding other complementary historical information, to create a post-flight record.

Live data sources can include aircraft system parameter communication feeds, and as well as live flight tracking.

These aircraft parameters and tracking signals enable a live assessment of the condition of the formation, particularly whether the proximity of the two aircraft is sufficient for fuel reduction. Historical data added later could include systems parameters stored in flight-data records and accessed through element 20.

Evaluation of historical flight tracks completed by element 22, as described in the basic embodiment, enables a computation of an Actual Flock Ratio for any pair of flights that paired successfully. Records storage in database 24 will be identifiable as 'Actual' operations.

Therefore, the information stored for historical theoretical records in the database 24 will be supplemented with additional information including:

Assessed Actual Flock Ratio
  Latitude and longitude at start of fuel saving operations
  Latitude and longitude at end of fuel saving operations
  Details of occasions where the fuel saving operation was interrupted or terminated
  Details of occasions where the pair of aircraft changed altitude and/or Mach.

For example, after having completed a number of formation flights aircraft, Airline A03 wishes to review the performance of the flights to assess the outcome. Each flight has records stored in database 24, identified as 'Actual' operations.

Through interface 30, airline A03 accesses the actual operational records stored in database 24.

Records of individual flights can be consulted, which include the actual fuel and flight time impacts, calculated on the basis of the actual flight parameters and records.

Summary and statistical information will be available for groups of historical records, according to selections defined by the user.

The user will be able to export reports in order to facilitate airline processes.

Figure 5:
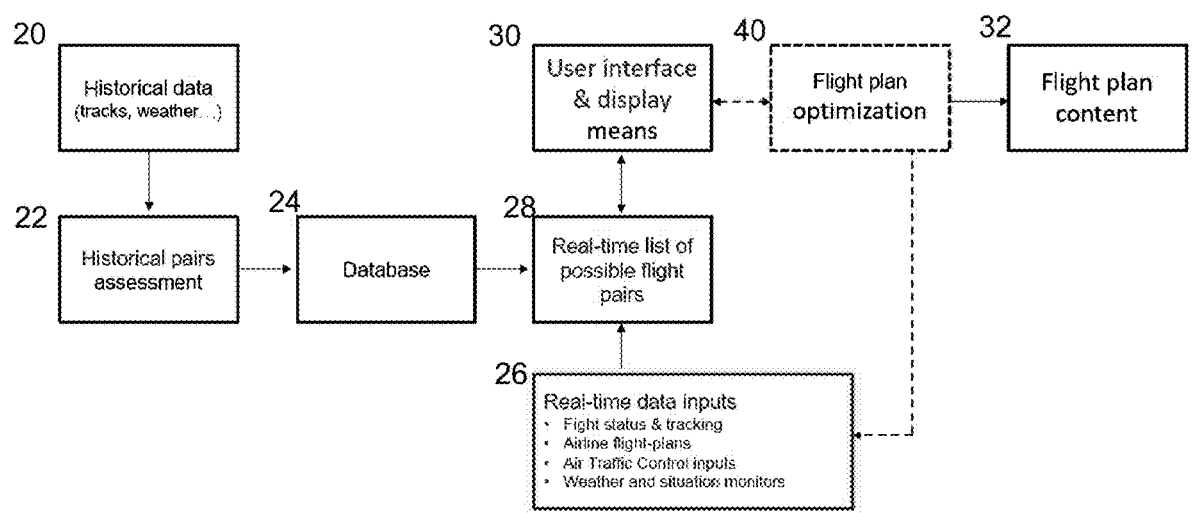
FIG. 5 is a schematic diagram illustrating a second advanced embodiment of the invention which includes a track optimization function for increasing Flock Ratio.

A second advanced embodiment of the basic implementation is shown in FIG. 5, and involves a means to increase the Forecast and Actual Flock Ratios by calculating the optimum track for the follower to take, when accounting for the fuel saving formation operation.

Under normal circumstances, when airlines are not considering flying in formation as a means of fuel saving, flight plans are evaluated to identify optimum routings, for example for minimum flight cost, or minimum fuel consumption. Optimizations are completed by evaluating different flight tracks against the identified measures and the optimal route is selected.

The opportunity to fly together with another aircraft to reduce fuel consumption offers a novel optimization parameter to be integrated into the evaluations completed in flight planning operations.

Figure 6A:
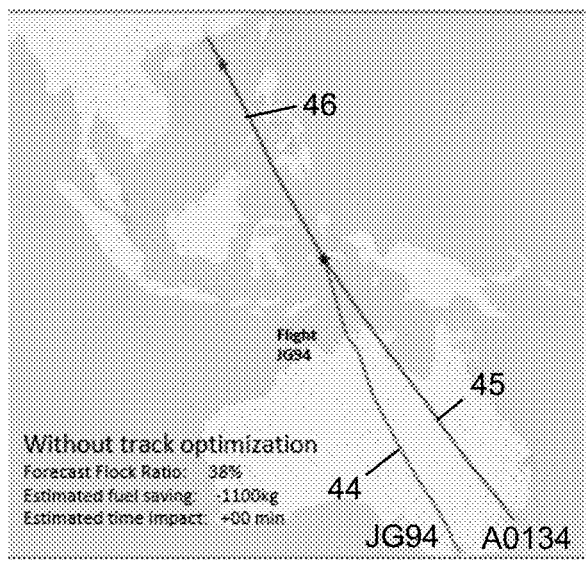
FIG. 6A is a schematic diagram illustrating the flight tracks of leader flight JG94 and follower flight A0134 without optimization of the track of A0134 to increase Forecast Flock Ratio.
Figure 6B:
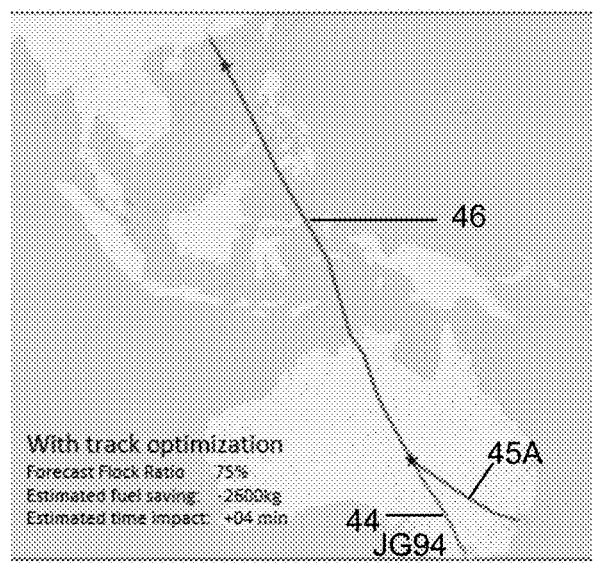
FIG. 6B is a schematic diagram illustrating the flight tracks of leader flight JG94 and follower flight A0134 with optimization of the track of A0134 to increase Forecast Flock Ratio.

Since the follower aircraft is the aircraft upon which the fuel saving is experienced, the track optimization element 40 examines the follower's track to identify how it can be optimized to increase the amount of track in common with the leader, thereby increasing the Flock Ratio, such as shown in FIG. 6B.

This process is initiated once the leader's track is either entered into the system through airline interface 30, or identified through the real-time inputs element 26 after having been submitted by the airline to the air traffic authorities.

Extra extent of track in common with the leader results in a higher Flock Ratio and a lower fuel consumption over that extra length. However, the follower's extra track length compared to the originally planned flight leads to extra fuel consumption and flight time. Therefore, the function of optimizer module 40 is to evaluate the optimal points at which the follower joins to and splits from the leader's track, which give the lowest overall follower fuel consumption, and which can be achieved within the follower's arrival time constraints.

Options for track optimization are displayed to the airline through interface 30 together with their associated estimations of fuel consumption, navigation fees, and arrival time.

Once the optimal track for the follower is selected by airline staff, data is made available with the information necessary for the creation or update of the follower's flight plan through element 32.

For example, airline A01 is using the system 18 of the invention to identify leader aircraft for its fleet of followers as described above and as per example 1. A candidate leader aircraft flight number JG94 is proposed by element 28 for airline A01's flight A0134.

As illustrated in FIGS. 6A and 6B, the flights A0134 and JG94 do not share the same destination and for this reason the historical tracks 44, 45 of the pair identified by element 22 exhibit divergence following an initial common section 46. Therefore, the FFR calculated by the element 28 using historical records is only 38%. The lower FFR means that fuel and flight time impacts are lower than can be experienced by other flights.

A new problem is experienced by airline A01 for flight A0134, namely, how to improve the opportunity offered by flight JG94 for flight A0134. The solution proposed by this advanced embodiment of the system is to optimize a track in order that the Forecast and Actual Flock Ratios of the pairing JG94-A0134 can be increased.

Since the follower flight A0134 is the flight which will experience an increased fuel saving benefit from the pairing operation, it is logical that the track of A0134 would be modified to more closely follow the track of JG94.

The flight plan of JG94 is made available either by direct input into the system through interface 30, or automatically through live inputs captured by system element 26.

As illustrated in FIG. 7, once flight JG94's flight plan is available, airline A01's users are alerted through interface 30. A new action choice subsequently becomes available to airline A01, to optimize the flight plan of flight A0134.

Since airline A01 is interested in reducing the fuel costs for the flight A0134, the user selects the optimization option through interface 30. The optimization study is then performed by element 40 and the results returned to the user through interface 30 including the estimated fuel burn reduction.

As the optimization involves an extension of A0134's track distance, the extra track length and the flight time impact will also be assessed by the system element 40 and communicated to the user through interface 30.

If a proposed track 45A is accepted by airline A01, action options in the interface 30 table of results display will enable the user to update the flight plan for flight A0134 with the new track.

Forecasts and estimates are updated as new live data inputs arrive. Flight status is updated as airline users take actions, including leader (L) and/or follower (F) validations of the proposed forecast pairings, and leader and/or follower filings of flight plans (FPLN).

Where changes in status enable new actions to be taken, such as optimization of the follower's flight plan to more closely match the leader's visual indications are available to users.

Figure 8:
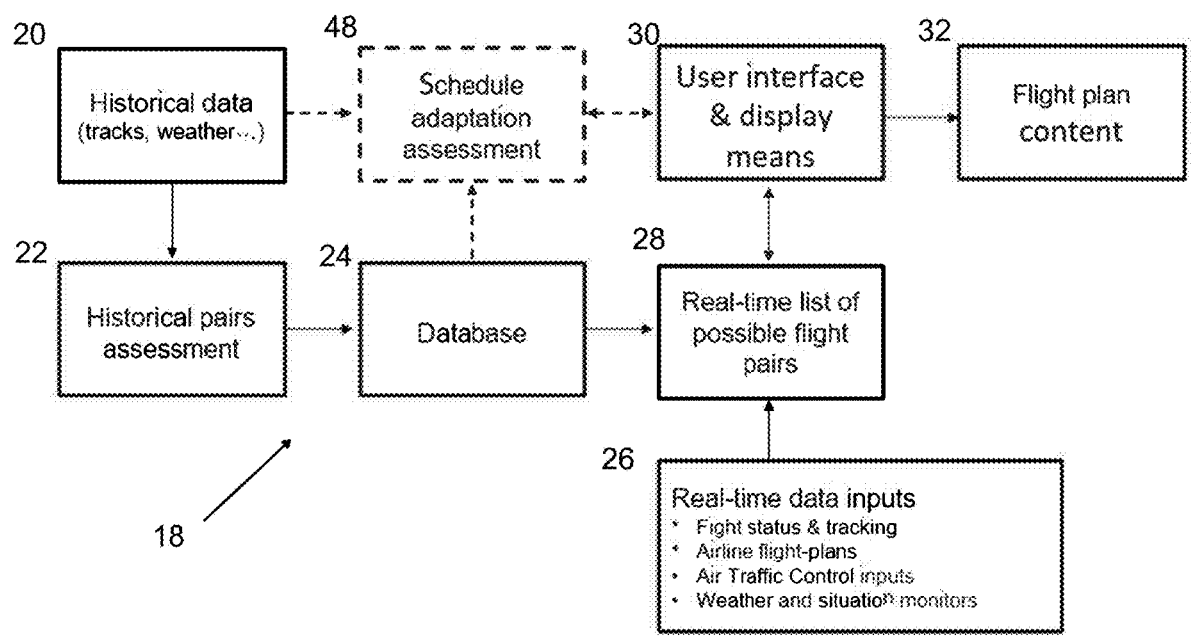
FIG. 8 is a schematic diagram illustrating a third advanced embodiment of the invention which includes a departure schedule time optimization function for increasing Flock Ratio.

A third advanced embodiment of the basic implementation of the invention is shown in FIG. 8, and involves a means to increase the Forecast Flock Ratio by modeling modifications to the scheduled departure time of any specific flight.

The Historical Pairs Assessment in the basic implementation element 22 studies flights for proximity within space and time. The flights must share a similar latitude and longitude within a window of only a few minutes.

However, in this advanced embodiment, an additional Historical Pairs Assessment is completed by element 48, with an enlarged time window of up to several hours. With the larger time window, element 48 is able to identify pairs of flights which are too far apart in time to be paired but which nevertheless do take similar routings.

Once candidate pairings are identified for a flight by enlarging the time window applied in element 22, element 48 calculates for each flight record, new alternative operational departure times which would have enabled the two aircraft to satisfy the normal pairing conditions of element 22.

These alternative operational departure times are calculated for follower aircraft, with the assumption that the associated leader's schedule is fixed. They are also calculated for leader aircraft, with the assumption that the associated follower's schedule is fixed.

For any flight being studied, the time delta (change) between the actual operational departure time and alternative operational departure time is calculated. The series of flight tracking data representing the entire flight is then recreated within element 48 with the time delta applied to each instance.

Subsequently, the algorithm of element 22 described above is applied within element 48 in order to determine an estimate of the Flock Ratio that could have resulted if the time delta had been applied historically. Estimates of the associated fuel and time impacts are also added.

Subsequently, element 48 takes into account historical flight departure delay information from source 20, to recalculate alternative scheduled departure times for each associated historical record.

Element 48 then identifies, among the different results for alternative scheduled departure time, the alternative departure time which would have offered the best overall performance. Overall performance is defined as a consistently high flock ratio value over the period being studied.

Results of the analysis are made available to airlines through interfaces 30 to facilitate decisions about alternative departure times.

Interfaces 30 allow airlines to discuss their decisions about schedule time adaptations.

For example, after having used the system of the invention for some time, Airline A01 wishes to conduct a review of the benefits of flying together in formation with other aircraft.

Using the records described in the first advanced embodiment above, airline A01 identifies a number of flights that are very infrequently paired with other aircraft (flights with low FFRs), and a number of other flights which have not experienced any pairings at all (flights with FFRs of zero).

Airline A01 places a high priority on reduction of fuel consumption across its operation. The problem experienced by airline A01 is therefore, how to improve the frequency of pairing opportunities for these identified flights. Airline A01 particularly wishes to identify pairing opportunities flights which can facilitate a high Flock Ratio.

Airline A01 uses the element 48 to study possible solutions to the problem through theoretical modifications to the scheduled departure time of the flights in question.

Airline A01 uses the interface to identify to element 48 which flights it wishes to study.

Element 48 then identifies possible flight pairings by expanding the time window studied by element 22. Subsequently, through the method described above, alternative departure times are proposed to the airline through the interface 30, together with the associated average flock ratio, and estimated average fuel and flight time impacts.

In subsequent discussions within the airline A01 where forthcoming flight schedules are being planned, the new information proposed through interface 30 is made available, and schedule decisions include new parameters related to fuel saving opportunities from flying in formation.

A number of improvements can be considered for the basic and advanced implementations of the system.

The previous sections describe three separate advanced embodiments to the basic embodiment initially described above. An improvement to the system would be to combine the basic embodiment and all three advanced embodiments into the same system. Of course, two of the three advanced embodiments may also be combined.

There are descriptions above of examples of a system where one airline has a fleet of follower aircraft, and another airline has a fleet of leader aircraft.

It is possible that an airline may have aircraft in its fleet which are capable of being both leaders and followers. Therefore, an improvement to the system would be for an airline to simultaneously use the tool in the manner described both for followers and for leaders.

The attribution of the leader and follower roles in the basic and advanced system is described as being a function of the capability of the aircraft, as confirmed by the airline through the interface input.

However, in cases where an aircraft is capable of being both a leader and follower, the decision regarding which order the two aircraft should fly in for an identified formation flight is more complex.

An improvement to the system 18 can be for it to simultaneously display both options to both airlines, together with the FFR and estimated fuel and flight time impacts. As illustrated in FIG. 9, a pair of flights may therefore be listed twice but in different leader/follower configurations.

Alternatively, the attribution of the leader and follower roles in the basic and advanced system is described as being a function of the capability of the aircraft, as confirmed by the airline through the interface input.

However, in cases where an aircraft is capable of being both a leader and follower, the decision regarding which order the two aircraft should fly in for an identified formation flight is more complex.

An improvement to the system 18 can be for it to assess the fuel and flight time impacts for both arrangements, and subsequently to display only the arrangement that provides the highest benefits, such as the highest fuel saving.

Alternatively, the attribution of the leader and follower roles in the basic and advanced system is described as being a function of the capability of the aircraft, as confirmed by the airline through the interface input.

However, in cases where an aircraft is capable of being both a leader and follower, the decision regarding which order the two aircraft should fly in for an identified formation flight is more complex.

An improvement to the system 18 can be for it to review the past history of flights for the two airlines involved in the identified pairing, and to include results in an automated assignment of the follower roles. For example, if airline A01's flight history shows that it has been a leader more than it has been a follower, then it would be assigned the follower role.

A set of rules such as these and others would be designed to ensure together equitable distribution of the opportunities to be followers among airline users of the system of the present invention.

In the proposed basic and advanced systems, the principal data used as a basis of assessment of the Flock Ratio and subsequent forecast is historical flight track data.

An improvement to the system 18 can be to include flight plan content as soon as it becomes available to the system, either indirectly through element 26 following filing of the flight plan with authorities, or after being entered directly into the system by the airline.

Examination of both flight plans for a possible pair of aircraft, and identification of the proportion of shared flight path, provides a measure of possible proximity of the intended flights.

Additionally, knowledge of the track to be followed by either the leader or follower aircraft can allow a refinement of modeling conducted by the FRS function described in section Step 2 above.

In the proposed basic and advanced systems, the Forecast Flock Ratio is calculated by the Flock Ratio Sensitivity model as a function of the live status of both leader and follower aircraft, as well as the state of the operating environment.

If the difference in Calculated Takeoff Time (CTT) between the two aircraft rises above a threshold modeled by the FRS, FFR will become low and therefore the pairing opportunity may no longer be viable.

An improvement to the system 18 would be to adapt the FRS model to provide, in addition to the FFR under actual circumstances, an Alternative Forecast Flock Ratio (AFFR) which would apply if the airline were to tactically adapt the departure time of an aircraft.

The AFFR would be associated with a second parameter called the Adapted Takeoff Time (ATT), which provides the airline with the new time at which an aircraft's departure should occur for an optimized AFFR.

In a simple example considering airline A operating aircraft A, and airline B operating aircraft B, it may occur that on a specific day aircraft A experiences a departure delay while aircraft B does not. This situation will trigger the FFR for the aircraft pairing A-B to fall.

In the proposed improvement, following the drop in FFR, the FRS will identify and communicate a new departure time ATT for aircraft B, and will display this to airline B in interface 30, together with the AFFR and estimated trip fuel and time impacts.

This improvement therefore provides to airline B the opportunity to tactically adapt to the live circumstances, using information provided by the system to coordinate with flight crew and airports to coordinate aircraft departures rather than lose a pairing opportunity.

The previous paragraph describes an advanced embodiment to facilitate an improvement to Flock Ratio by pre-departure adaptation of the follower's flight plan in order to more closely resemble the leader's flight.

An improvement to the system 18 would be to continually offer this feature in the post-departure phase.

Such an improvement would provide additional time for improving Flock Ratio, and would be especially useful in cases where two flights have successfully paired in the skies and some distance remains before a split would be necessary under the original flight plans.

It could also be useful in cases where low or zero Forecast Flock Ratios were assessed for a pair of flights, but due to changes in operational and environmental circumstances post departure, the specific pair becomes operationally viable.

A portion of the above description describes the second advanced embodiment to facilitate an improvement to Flock Ratio by modification of a follower's flight routing in order to more closely resemble the leader's flight.

An improvement to the system 18 would be to offer this facility instead, by modification of the leader's flight routing to more closely resemble the follower's.

It could also be possible to modify both leader and follower flight tracks.

The third advanced embodiment is described above to improve the opportunities to find pairings for flights, by examining modifications of their departure schedules.

An improvement to the system 18 would be to also use it for new flights under study by airlines. An airline would provide information concerning the intended new flight, such as aircraft type or types, Takeoff Weight, and a window of time for the intended departure.

If the system 18 is integrated into a flight planning software, the system will identify flight tracks for the individual flight case at the user's request. If the system 18 is not integrated into a flight planning software, example tracks for the individual flight case would be provided as an input from the user.

The improvement will then perform, for a range of different departure times, assessment of potential pairings and their estimated measures of quality such as Estimated Flock Ratio, fuel and flight time impacts.

The results will be available to the user, as information to be used in flight scheduling activities.

The third advanced embodiment is described above to improve the opportunities to find pairings for flights, by examining modifications of the departure schedules for either a leader or a follower aircraft.

An improvement to the system 18 would be to provide, in addition, the possibility to study improvements to opportunities if changes were considered to both leader and follower scheduled departure times.

This feature could be of benefit for airlines studying schedule optimization within their own operation, or for airlines accustomed to close coordination.

An advanced embodiment is described above to improve the opportunities to find pairings for flights. As described, the proposal considers that the study is initiated by the airline.

An improvement to the system 18 would be for the system to initiate the study automatically. The system 18 could then provide key results to the user through interface 30, for the user's closer examination.

The various systems, elements, modules and devices described herein may include a controller or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems for detecting skew in a wing slat of an aircraft described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system to identify pairs of aircraft which can be brought together in a pairing formation as a leader aircraft and a follower aircraft flying in a wake upwash of the leader aircraft to generate fuel savings and to generate information required to enable a flight operation comprising:
   a first data module configured to source historical data including aircraft flight track data, and weather and traffic conditions at airports and in flight zones,
   a first assessment module configured to transform data from the first data module and to identify pairs of aircraft flights which were sufficiently close together under historical conditions to be suitable for the pairing formation, and for each identified pair of aircraft flights, to estimate a magnitude of a fuel saving benefit and any associated flight time impact which would occur if the aircraft of the identified pair of aircraft flights had flown together in the pairing formation, and to retrieve additional historical data relating to each identified pair of aircraft flights from the first data module including weather and traffic information,
   a database configured to store the information relating to each pair of aircraft flights identified by the first assessment module, as well as the additional historical data including weather and traffic information relating to each identified pair of aircraft flights, the database including an indexing system allowing a linkage of the information for identified flight pairs to scheduled airline flights across time, an input module configured to allow real-time data inputs of data relating to flight status and tracking of scheduled airline flights of the identified flight pairs and at least one of airline flight-plans, air traffic control inputs, or weather and situation monitors, a second assessment module configured to compute a measure of likely proximity of pairs of planned flights and to generate a real-time list of possible flight pairs based on information from the database and the input module, a user interface and display device configured to permit users to input data including a registration of an aircraft scheduled for use on a specific flight and an aircraft's level of capability for participating in a formation flight pair as either the leader aircraft or as the follower aircraft, and to display possible flight pairs for each airline flight, a flight plan module configured to execute an action based on a combination of the computation of the second assessment module, the input module, and the user interface, the action including modifying a flight plan; and executing the action.

2. The system according to claim 1, wherein the first assessment module is configured to generate a graph database comprising nodes and edges connecting the nodes, wherein each node represents a segment of a flight path and each edge contains information about any identified relationship between the two nodes to which such edge is connected and to utilize the graph database to determine a theoretical flock ratio as a percentage of total segments for a flight which are assessed in proximity to another flight.

3. The system according to claim 2, wherein, the second assessment module is configured to assess a sensitivity of variation of the theoretical flock ratio based on live data received from the input module to generate a forecast flock ratio for each of the possible flight pairs.

4. The system according to claim 3, wherein the second assessment module is configured to repeatedly reassess the forecast flock ratio as additional live data is received.

5. The system according to claim 1, wherein the user interface is configured to permit one airline to communicate with another airline regarding possible flight pairings.

6. The system according to claim 1, wherein the second assessment module is configured to determine estimated fuel consumption and flight time impacts for each aircraft of each possible flight pairing.

7. The system according to claim 1, further including a third assessment module configured to assess actual operational performance of the aircraft for each airline flight and create a post-flight record.

8. The system according to claim 1, further including an optimization module configured to optimize flight paths of at least one of the leader aircraft and the follower aircraft to provide a lowest overall fuel consumption of the leader aircraft and the follower aircraft.

9. The system according to claim 8, wherein the optimization module is configured to optimize the flight path of the follower aircraft to provide a lowest fuel consumption of the follower aircraft.

10. The system according to claim 1, further including a schedule adaption assessment module configured to assess pairs of flights too far apart in time to be efficiently paired, and to calculate alternative operational departure times for one or both of the leader aircraft and the follower aircraft in order to enable the flights of the pair to satisfy normal pairing conditions.

11. The system according to claim 1, further including:
a third assessment module configured to assess actual operational performance of the aircraft for each airline flight and create a post-flight record, an optimization module configured to optimize flight paths of at least one of the leader aircraft and the follower aircraft to provide a lowest overall fuel consumption of the leader aircraft and the follower aircraft, and a schedule adaption assessment module configured to assess pairs of flights too far apart in time to be efficiently paired, and to calculate alternative operational departure times for one or both of the leader aircraft and the follower aircraft in order to enable the flights of the pair to satisfy normal pairing conditions.

12. The system according to claim 1, wherein the action performed by the flight plan module further includes holding a flight plan content for flight operations of the aircraft for each airline flight.

13. A method for identifying pairs of aircraft which can be brought together in a pairing formation as a leader aircraft and a follower aircraft flying in a wake upwash of the leader aircraft to generate fuel savings and to generate information required to enable a flight operation comprising the steps:
providing input conditions concerning a flight intended to be flown by an aircraft, consulting a database of historical records of flight pairs of said flight intended to be flown with other historical flights with similar flight times and route trajectories, to create a list of possible flight pairs meeting a predetermined pairing quality criteria, comparing historical and live data relating to each of the flights in each possible flight pair to measure forecast pairing quality, displaying the forecast pairing quality results in a user interface, continuously updating the measured pairing quality with live data relating to actual flight status of the two flights in each flight pair, validating a proposed pairing of two flights in a possible flight pair, executing an action based on a combination of the comparison of the historical data and the live data, the continual updating of the measured pairing quality, and the validation of the proposed pairing, the action including at least one of preparing or modifying a flight plan for each flight in the validated pairing.

14. The method according to claim 13, wherein the input conditions include flight number, date of operation, origin and destination airports, assigned aircraft type and registration, whether the aircraft is qualified as a leader aircraft or a follower aircraft.

15. The method according to claim 13, wherein the input conditions further include at least one of estimated operating weight at departure, limits on minimum fuel saving, limits on maximum flight time impact.

16. The method according to claim 13, including a step of extracting information via the user interface for modification of a flight plan.

17. The method according to claim 13, including a step of sending a message from one airline to another airline via the user interface.

* * * * *